United States Patent
Tallet et al.

(10) Patent No.: US 8,811,235 B2
(45) Date of Patent: *Aug. 19, 2014

(54) SYSTEM AND METHOD FOR ASSURING THE OPERATION OF NETWORK DEVICES IN BRIDGED NETWORKS

(71) Applicant: Cisco Technology, Inc., San Jose, CA (US)

(72) Inventors: Francois Edouard Tallet, Santa Clara, CA (US); Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/658,469

(22) Filed: Oct. 23, 2012

(65) Prior Publication Data

US 2013/0051218 A1    Feb. 28, 2013

Related U.S. Application Data

(63) Continuation of application No. 11/183,002, filed on Jul. 15, 2005, now Pat. No. 8,325,629.

(51) Int. Cl.
*H04L 12/28* (2006.01)

(52) U.S. Cl.
USPC .......................................................... 370/256

(58) Field of Classification Search
None
See application file for complete search history.

(56) References Cited

U.S. PATENT DOCUMENTS

| | | | |
|---|---|---|---|
| 6,032,194 A | 2/2000 | Gai et al. | |
| 6,081,512 A | 6/2000 | Muller et al. | |
| 6,188,694 B1 | 2/2001 | Fine et al. | |
| 6,202,114 B1 | 3/2001 | Dutt et al. | |
| 6,219,739 B1 * | 4/2001 | Dutt et al. | ..................... 710/311 |
| 6,262,977 B1 | 7/2001 | Seaman et al. | |

(Continued)

FOREIGN PATENT DOCUMENTS

WO    2003077459    9/2003

OTHER PUBLICATIONS

Spanning Tree Protocol Problems and Related Design Considerations, Internet Tech Notes, Document ID No. 10556, (http://www.cisco.com/warp/customer/473/16.html), Cisco Systems, Inc., May 25, 2005, pp. 1-19.

(Continued)

*Primary Examiner* — Faruk Hamza
*Assistant Examiner* — Andrew Oh
(74) *Attorney, Agent, or Firm* — Novak Druce Connolly Bove + Quigg LLP (57) ABSTRACT

In one embodiment, a spanning tree protocol (STP) is executed to assign a first port of an intermediate network device to a Root Port Role, a second port of the intermediate network device to an Alternate Port Role, a third port of the intermediate network device to a Designated Port Role, and a fourth port of the intermediate network device to a Backup Port Role. At least one bridge protocol data unit (BPDU) message is periodically sent from the first port assigned Root Port Role, the second port assigned Alternate Port Role and the fourth port assigned Backup Port Role, irrespective of receipt of any BPDU messages from neighboring intermediate network devices. In response to a failure to receive a BPDU message from a neighboring intermediate network device on the third port assigned Designated Port Role within a threshold amount of time, one or more actions are taken.

20 Claims, 4 Drawing Sheets

(56) References Cited

U.S. PATENT DOCUMENTS

| | | |
|---|---|---|
| 6,330,229 B1 | 12/2001 | Jain et al. |
| 6,373,826 B1 | 4/2002 | Russell et al. |
| 6,388,995 B1 * | 5/2002 | Gai et al. .................. 370/256 |
| 6,515,969 B1 | 2/2003 | Smith |
| 6,611,502 B1 * | 8/2003 | Seaman .................. 370/256 |
| 6,628,624 B1 * | 9/2003 | Mahajan et al. .............. 370/256 |
| 6,680,917 B1 * | 1/2004 | Seaman .................. 370/256 |
| 6,697,339 B1 | 2/2004 | Jain |
| 6,766,482 B1 | 7/2004 | Yip et al. |
| 6,801,506 B1 | 10/2004 | Dey |
| 6,813,250 B1 | 11/2004 | Fine et al. |
| 6,898,189 B1 | 5/2005 | Di Benedetto et al. |
| 6,934,262 B1 | 8/2005 | Lau et al. |
| 6,937,576 B1 | 8/2005 | Di Benedetto et al. |
| 6,944,130 B1 | 9/2005 | Chu et al. |
| 6,976,088 B1 * | 12/2005 | Gai et al. .................. 709/238 |
| 7,177,946 B1 | 2/2007 | Kaluve et al. |
| 7,379,429 B1 * | 5/2008 | Thottakkara .................. 370/256 |
| 7,398,322 B1 | 7/2008 | Perlman |
| 7,440,414 B2 * | 10/2008 | Higashiyama .................. 370/254 |
| 7,463,591 B1 | 12/2008 | Kompella et al. |
| 7,586,856 B1 * | 9/2009 | Thottakkara et al. ......... 370/256 |
| 7,848,264 B1 * | 12/2010 | Gai et al. .................. 370/256 |
| 7,911,938 B2 | 3/2011 | Florit et al. |
| 7,965,621 B2 | 6/2011 | Farkas et al. |
| 7,983,173 B2 | 7/2011 | Finn |
| 2002/0052936 A1 * | 5/2002 | Gai et al. .................. 709/220 |
| 2002/0147800 A1 * | 10/2002 | Gai et al. .................. 709/221 |
| 2003/0037162 A1 | 2/2003 | Kotser |
| 2003/0091014 A1 * | 5/2003 | Meier .................. 370/338 |
| 2003/0202463 A1 | 10/2003 | de Heer et al. |
| 2004/0105455 A1 | 6/2004 | Seaman |
| 2004/0190454 A1 * | 9/2004 | Higasiyama .................. 370/238 |
| 2004/0223503 A1 | 11/2004 | Lynch et al. |
| 2004/0240398 A1 * | 12/2004 | Ho et al. .................. 370/256 |
| 2005/0108187 A1 * | 5/2005 | Fujibayashi .................. 707/1 |
| 2005/0198232 A1 | 9/2005 | Haalen et al. |
| 2005/0201409 A1 | 9/2005 | Griswold et al. |
| 2005/0237943 A1 * | 10/2005 | Sasagawa .................. 370/242 |
| 2005/0249123 A1 | 11/2005 | Finn |
| 2006/0013141 A1 | 1/2006 | Mutoh et al. |
| 2006/0045021 A1 | 3/2006 | Deragon et al. |
| 2006/0146845 A1 | 7/2006 | Rose |
| 2006/0245376 A1 | 11/2006 | Ge et al. |
| 2007/0025275 A1 | 2/2007 | Tallet et al. |
| 2007/0041373 A1 | 2/2007 | Lor et al. |

OTHER PUBLICATIONS

"Understanding Rapid Spanning—Tree Protocol," Cisco, Nov. 1, 2002.
"IEEE Std 802.10-2004," IEEE Computer Society, Jun. 2004.

* cited by examiner

SYSTEM AND METHOD FOR ASSURING THE OPERATION OF NETWORK DEVICES IN BRIDGED NETWORKS

RELATED CASES

This Application for United States Patent is a continuation of U.S. patent application Ser. No. 11/183,002 filed on Jul. 15, 2005 by Francois E. Tallet et al., for a "System and Method for Assuring the Operation of Network Devices in Bridged Networks", the contents of which are incorporated by reference herein in their entirety.

BACKGROUND OF THE INVENTION

1. Field of the Invention

The present invention relates generally to computer networks, and more specifically, to a method and apparatus for assuring the proper operation of intermediate network devices.

2. Background Information

A computer network typically comprises a plurality of interconnected entities. An entity may consist of any device, such as a server or end station, that "sources" (i.e., transmits) or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs may be interconnected by point-to-point links, wireless transceivers, satellite hook-ups, etc. to form a wide area network ("WAN") or intranet that may span an entire country or continent.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information between a plurality of LANs or end stations. Typically, the bridge or switch is a computer and includes a plurality of ports that couple the bridge to the LANs or end stations. The switching function includes receiving data from a sending entity at a source port and transferring that data to at least one destination port for forwarding to the receiving entity.

Switches and bridges typically learn which destination port to use in order to reach a particular entity by noting on which source port it received a message generated by that entity. This information is then stored by the bridge in a block of memory referred to as a filtering database. Thereafter, when a message addressed to a given entity is received on a source port, the bridge looks up the entity in its filtering database and identifies the appropriate destination port to reach that entity. If no destination port is identified in the filtering database, the bridge floods the message out all ports, except the port on which the message was received. Messages addressed to broadcast or multicast addresses are also flooded.

Additionally, most computer networks are either partially or fully meshed. That is, they include redundant communications paths so that a failure of any given link or device does not isolate any portion of the network. The existence of redundant links, however, may cause the formation of circuitous paths or "loops" within the network. Loops are highly undesirable because data frames may traverse the loops indefinitely. Furthermore, because switches and bridges replicate (i.e., flood) frames whose destination port is unknown or which are directed to broadcast or multicast addresses, the existence of loops may cause a proliferation of data frames so large that the network becomes overwhelmed.

Spanning Tree Protocol

To avoid the formation of loops, most bridges and switches execute a spanning tree protocol or algorithm which allows them to calculate an active network topology that is loop-free (i.e., a tree) and yet connects every pair of LANs within the network (i.e., the tree is spanning). The Institute of Electrical and Electronics Engineers (IEEE) has promulgated a standard (IEEE Std. 802.1D-1998) that defines a spanning tree protocol to be executed by 802.1D compatible devices. In general, by executing the 802.1D spanning tree protocol, bridges elect a single bridge within the bridged network to be the "root" bridge. The 802.1D standard takes advantage of the fact that each bridge has a unique numerical identifier (bridge ID) by specifying that the root is the bridge with the lowest bridge ID. In addition, for each LAN coupled to more than one bridge, only one (the "designated bridge") is elected to forward frames to and from the respective LAN. The designated bridge is typically the one closest to the root. Each bridge also selects one port (its "root port") which gives the lowest cost path from that bridge to the root. The root ports and designated bridge ports are selected for inclusion in the active topology and are placed in a forwarding state so that data frames may be forwarded to and from these ports and thus onto the corresponding paths or links of the network. Ports not included within the active topology are placed in a discarding or blocking state. When a port is in the blocking state, data frames will not be forwarded to or received from the port, although control frames may continue to be received and processed by the bridge. A network administrator may also exclude a port from the spanning tree by placing it in a disabled state.

To obtain the information necessary to run the spanning tree protocol, bridges exchange special messages called configuration bridge protocol data unit (BPDU) messages. More specifically, upon start-up, each bridge initially assumes that it is the root and transmits BPDU messages accordingly. Upon receipt of a BPDU message from a neighboring device, its contents are examined and compared with similar information (e.g., assumed root and lowest root path cost) stored by the receiving bridge. If the information from the received BPDU is "superior" to the stored information, the bridge adopts the superior information and uses it in the BPDUs, if any, that it sends (adding the cost associated with the receiving port to the root path cost) from its ports. Bridges do not send BPDU messages from ports on which the "superior" information was received such as root ports. Although BPDU messages are not forwarded by bridges, the identifier of the root is eventually propagated to and adopted by all bridges as described above, allowing them to select their root port and any designated port(s).

In order to adapt the active topology to changes and failures, the root periodically (e.g., every hello time) transmits BPDU messages from its ports. The default hello time is two seconds. In response to receiving BPDUs on their root ports, bridges transmit their own BPDUs from their designated ports, if any. Thus, every two seconds BPDUs are propagated throughout the bridged network, confirming the active topology. If a bridge stops receiving BPDU messages on a given port (indicating a possible link or device failure), it will continue to increment a timer until the timer reaches a maximum age (max age) threshold at which point the timer expires. The bridge will then age out, i.e., discard, its stored BPDU information and proceed to re-calculate the root, root path cost and root port by transmitting BPDU messages utilizing the next best information it has. The maximum age value used within the bridged network is typically set by the root, which enters the appropriate value in its BPDU messages. Normally, each bridge replaces its stored BPDU information every hello time, thereby preventing it from being discarded and maintaining the current active topology.

When BPDU information is updated and/or aged-out and the active topology is re-calculated, ports may transition from the blocking state to the forwarding state and vice versa. That is, as a result of new BPDU information, a previously blocked port may learn that it should be in the forwarding state (e.g., it is now the root port or a designated port). Rather than transition directly from the blocking state to the forwarding state, the IEEE 802.1D-1998 standard calls for ports to transition through two intermediate states: a listening state and a learning state. In the listening state, a port waits for information indicating that it should return to the blocking state. If, by the end of a preset time, no such information is received, the port transitions to the learning state. In the learning state, a port still blocks the receiving and forwarding of frames, but received frames are examined and the corresponding location information is stored in the bridge's filtering database. At the end of a second preset time, the port transitions from the learning state to the forwarding state, thereby allowing frames to be forwarded to and from the port. The time spent in each of the listening and the learning states is referred to as the forwarding delay.

Although the spanning tree protocol provided in the IEEE 802.1D-1998 standard is able to maintain a loop-free topology despite network changes and failures, recalculation of the active topology can be a time consuming and processor intensive task. For example, re-calculation of the spanning tree following an intermediate device crash or failure can take approximately thirty seconds. During this time, message delivery is often delayed as ports transition between states. Such delays can have serious consequences on time-sensitive traffic flows, such as voice or video traffic streams.

Rapid Spanning Tree Protocol

Recently, the IEEE issued a new version of the 802.1D standard, known as IEEE Std. 802.1D-2004, that describes a rapid spanning tree protocol (RSTP) to be executed by otherwise 802.1D compatible devices. The RSTP similarly selects one bridge of a bridged network to be the root bridge and defines an active topology that provides complete connectivity among the LANs while severing any loops. Each individual port of each bridge is assigned a port role according to whether the port is to be part of the active topology. The port roles defined by the 802.1D-2004 standard include Root, Designated, Alternate and Backup. The bridge port offering the best, e.g., lowest cost, path to the root is assigned the Root Port Role. Each bridge port offering an alternative, e.g., higher cost, path to the root is assigned the Alternate Port Role. Each bridge port providing the lowest cost path from a given LAN is assigned the Designated Port Role, while all other ports coupled to the given LAN in loop-back fashion are assigned the Backup Port Role.

Those ports that have been assigned the Root Port and Designated Port Roles are placed in the forwarding state, while ports assigned the Alternate and Backup Roles are placed in a discarding or blocking state. A port assigned the Root Port Role can be rapidly transitioned to the forwarding state provided that all of the ports assigned the Alternate Port Role are placed in the discarding or blocking state. Similarly, if a failure occurs on the port currently assigned the Root Port Role, a port assigned the Alternate Port Role can be reassigned to the Root Port Role and rapidly transitioned to the forwarding state, provided that the previous root port has been transitioned to the discarding or blocking state. A port assigned the Alternate Port Role or a Backup Port Role that is to be reassigned to the Designated Port Role can be rapidly transitioned to the forwarding state, provided that the roles of the ports of the downstream bridge are consistent with this port being transitioned to forwarding. The RSTP provides an explicit handshake to be used by neighboring bridges to confirm that a previously blocking port can rapidly transition to the forwarding state.

Like the original version of the STP described in IEEE Std. 802.1D-1998, bridges running the RSTP also exchange BPDU messages in order to determine which roles to assign to the bridge's ports. As with the prior STP standard, bridges running RSTP only send periodic BPDU messages from ports assigned to the Designated Port Role. BPDU messages are not sent from ports assigned to any other roles. BPDU messages are, however, utilized in the handshake employed to rapidly transition designated ports to the forwarding state. Thus, before transitioning Alternate Port to the Root Port, the bridge will send a BPDU message from the Alternate Port. RSTP also uses timers, including a received information while (rcvdInfoWhile) timer, which is similar to STP's max age timer. The rcvdInfoWhile timer is a count down (to zero) timer, while the max age timer is a count up timer.

Loops and Failures Undetectable by Spanning Tree Protocols

In some cases, a single, duplex link coupling two neighboring bridges (which are also indirectly coupled through other bridges or devices) may physically comprise two simplex, i.e., unidirectional, transmission lines, such as two fiber optic lines, operating in opposite directions. Certain failures associated with such lines can result in the formation of loops that are undetectable by the STP. For example, suppose two bridges, designated A and B, are connected by a single trunk link formed from two unidirectional transmission lines, and that the respective port at Bridge B is assigned the designated port role, while the peer port at Bridge A is assigned the alternate port role. In this case, the port at Bridge B is placed in the forwarding state and the port at bridge A is placed in the discarding state. As long as the port at Bridge A continues to receive "superior" BPDU messages from Bridge B, it will remain in the blocking state. Suppose, however, that the trunk link becomes unidirectional. That is, bridge B continues to send BPDU messages to Bridge A, but these BPDU messages are never received, and yet the trunk line is not considered to be "down". Accordingly, the BPDU information stored for the port at Bridge A eventually ages out and the STP running at Bridge A transitions the port to the forwarding state. Because Bridge B is unaware of the link failure, the port at Bridge B remains in the forwarding state. With the ports at both Bridge A and Bridge B in the forwarding state a loop is created. As described above, the creation of such a loop causes network messages to be replicated, wasting substantial network bandwidth and potentially causing a network outage.

A loop may also be created as a result of an error or failure in the operation of the STP process at Bridge B, such as a software error. Specifically, control messages, like BPDU messages, are often processed by software elements executing at a microprocessor located on a supervisor module. In contrast, data messages are typically processed by one or more hardware elements disposed on a line card in order to improve the bridge's performance. This may lead to a situation in which the control plane at the bridge, e.g., the execution of the STP process at the supervisor module, fails or becomes too busy to run the STP in a timely manner, while the hardware elements at the line cards continue to process and forward data messages. As a result of such a failure at the control plane, Bridge B may stop sending BPDU messages sent from a given port, even though it continues to forward data messages from this port. In response, the STP process running at Bridge A concludes that its port should now be re-assigned the Designated Port Role and that it should be transitioned to the forwarding state. With the ports at both Bridge A and Bridge B in the forwarding state, a loop is created.

In summary, unidirectional failures resulting in the formation of loops may occur as a result of malfunctioning or faulty network interface cards (NICs) and/or transceivers. Similarly, a switch's microprocessor may become too busy with other tasks to send BPDU messages for a relatively long time, or a software crash may occur in the control plane resulting in the formation of a loop. In addition, if a link up/down detection and/or autonegotiation protocol is disabled, e.g., by network administrator action, unidirectional failures may go undetected, resulting in loops. Accordingly, a need exists to assure the continued and proper operation of intermediate network devices within a computer network.

SUMMARY OF THE INVENTION

Briefly, the present invention is directed to a system and method for assuring the proper operation of intermediate network devices, such as bridges, in computer networks. An intermediate network device operating in accordance with the present invention preferably includes a plurality of ports for receiving and forwarding network messages and a spanning tree protocol (STP) engine in communicating relationship with the ports. The STP engine includes a port transition state machine for transitioning the ports among a plurality of STP states, such as a discarding or blocking state, and a forwarding state. The STP engine also includes a port role selection state machine for assigning STP roles to the ports or for recognizing the association of roles to the ports, including a Root Port Role, an Alternate Port Role, a Designated Port Role and a Backup Port Role. In accordance with the present invention, the STP engine further includes a bridge assurance (BA) sub-engine. The BA sub-engine determines whether neighboring bridges are operating properly, and takes corrective action if an error condition is detected.

First, the BA sub-engine preferably directs the STP engine to generate and send configuration bridge protocol data unit (BPDU) messages from ports assigned to the Root, Alternate and Backup roles. That is, the BA sub-engine directs the STP to periodically send BPDU messages from the bridge's Root and Alternate ports, in addition to the BPDU messages that the STP sends from the bridge's Designated ports. The BA sub-engine also looks for the receipt of BPDU messages on all bridge ports to which at least one neighboring bridge is coupled. Accordingly, if BPDU messages are never received on such a port, or they stop being received, the BA sub-engine detects an error condition, such as a uni-directional link failure. In one embodiment, the BA sub-engine will also prevent a port that stops receiving BPDUs from being transitioned to a forwarding state. Thus, by directing the STP engine to now send BPDU messages from the bridge's Root and Alternate ports as well as its Designated ports, the BA sub-engine is able to assure that its neighbor bridges are operating properly.

In addition to directing the STP engine to send BPDU messages from Root, Alternate and Backup ports, the BA sub-engine also includes a plurality of timers for each port, which are used in response to the detection of certain failures. More specifically, when a BPDU message is first received on a port, the BA sub-engine starts a BA timer for that port. Each time another BPDU message is received on the port, the port's BA timer is re-started. If the timer expires, indicating that the port never received any BPDU messages or stopped receiving BPDU messages, then BA sub-engine directs the STP engine to transition the affected port to the discarding state. In addition, if a Root or Alternate port receives a BPDU carrying information that is inferior to the STP information stored by that port, a role restricted timer is started. If the BPDU with inferior information was received on a Root port, then the BA sub-engine directs the STP engine to elect a new root port. The BA sub-engine also prevents a port whose role restricted timer is running from being elected the Root port, and instead causes the port to end up as an Alternate port. The role restricted timer may be de-activated when the port becomes an Alternate port, or if the port stops receiving BPDU messages with the inferior information.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
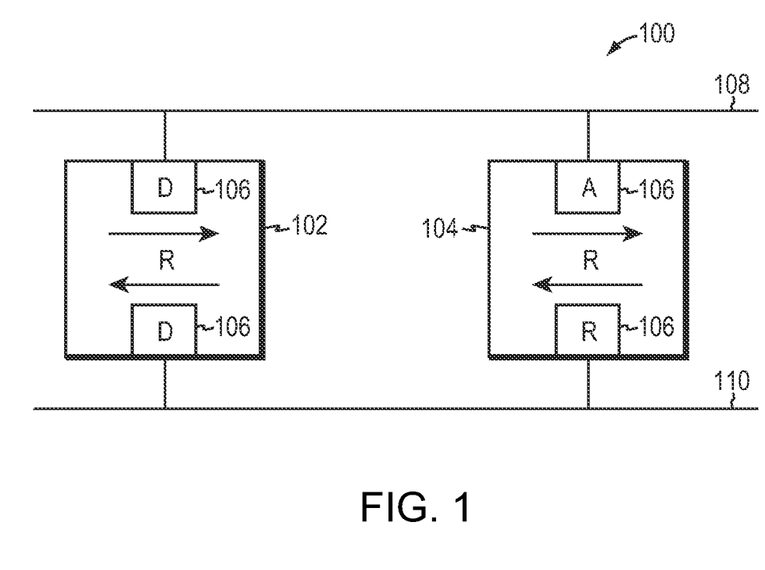
FIG. 1 is a highly schematic illustration of a computer network.

FIG. 1 is a highly schematic illustration of a computer network 100 in accordance with the present invention. Network 100 includes two intermediate network devices, such as bridges, 102 and 104. Each bridge 102 and 104, moreover, has a plurality of ports 106 for interconnecting the bridges to other network entities, such as end stations, bridges, hubs, routers, local area network (LAN) segments, etc. Bridges 102 and 104 are interconnected by two segments 108 and 110, which may be LANs or other shared media. Each bridge preferably identifies its own ports, e.g., by port numbers such as zero (P0), one (P1), two (P2), etc. The bridges 102 and 104 are thus able to associate specific ports with that are reachable through those ports.

It should be understood that the network 100 of FIG. 1 is meant for illustrative purposes only, and that the present invention will operate with other, possibly far more complex, network topologies.

As shown, network 100 includes redundant paths interconnecting switches 102 and 104. The existence of redundant paths in a computer network typically prevents portions of the network from becoming isolated should any constituent segment or intermediate device fail. Such redundancy, however, also results in the creation of loops, which, as described above, are highly undesirable in layer 2 (L2) networks.

Execution of a spanning tree protocol (STP) or algorithm prevents loops by defining a loop-free network topology (i.e., an active topology). However, as set forth above, in some situations, conventional spanning tree protocols or algorithms may not detect the existence or formation of all loops. In addition, the conventional spanning tree protocols or algorithms do not identify other errors or failures, such as failures occurring in the control plane of neighboring bridges. To assure that the bridges 102 and 104 of network 100 are operating properly, among other reasons, bridges 102 and 104 preferably utilize a "bridge assurance" mechanism in accordance with the present invention.

Figure 2:
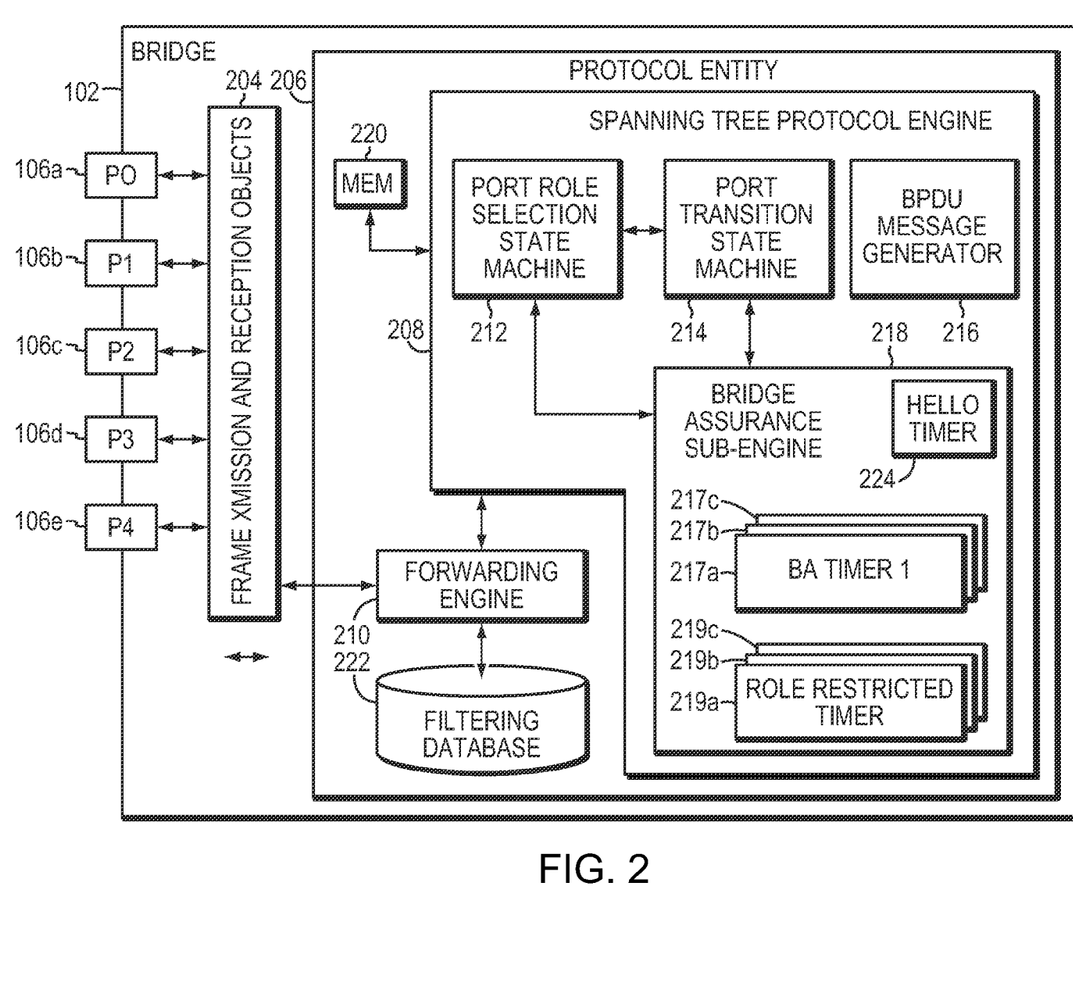
FIGS. 2 and 3 are highly schematic, partial block diagrams of an intermediate network device in accordance with the present invention.

FIG. 2 is a partial block diagram of an intermediate network device in accordance with the present invention, such as bridge 102. As mentioned above, bridge 102 includes a plurality of ports 106a-e each of which is preferably identified by a number (e.g., P0-P4). Bridge 102 further includes one or more frame transmission and reception objects, designated generally 204, that are associated with the ports 106a-e, such that network messages, including data and control packets and frames, received at a given port, e.g., P3, may be captured, and frames to be transmitted by bridge 102 may be delivered to a given port, e.g., P1.

Bridge 102 further includes at least one protocol entity 206 comprising a plurality of components. In particular, the protocol entity 206 includes at least one spanning tree protocol (STP) engine 208 and at least one forwarding engine 210. The STP engine 208 preferably comprises a plurality of subcomponents, including a port role selection state machine 212, a port transition state machine 214, and a bridge protocol data unit (BPDU) message generator 216. In accordance with the preferred embodiment, the STP engine 208 further includes a bridge assurance sub-engine 218. Except as described herein, the STP engine 208 preferably operates substantially in compliance with a known spanning tree protocol or algorithm, such as the Rapid Spanning Tree Protocol (RSTP) defined in IEEE Std. 802.1D-2004 specification standard, or the Multiple Spanning Trees (MST) protocol defined in IEEE Std. 802.1S supplement to IEEE Std. 802.1Q, among others, both of which are hereby incorporated by reference in their entirety.

The bridge assurance sub-engine 218 preferably includes or otherwise has access to several sub-components of its own. In particular, the bridge assurance sub-engine 218 preferably has one or more BA timers, such as BA timers 217a-c, and one or more role restricted timers, such a role restricted timers 219a-c.

The STP engine 208 includes or is in communicating relationship with a memory 220, which may be a volatile or non-volatile random access memory (RAM) or some other memory structure or device. Memory 220 is preferably organized to include a plurality of records or cells (not shown) for storing spanning tree related information or parameters, such as the switch's numeric bridge identifier (ID), the assigned path cost for each port 106a-e, the current or "best" spanning tree information for each port P0-P4, etc.

The forwarding engine 210 is in communicating relationship with the frame transmission and reception objects 204 and is coupled to at least one filtering database 222 that stores address information corresponding to at least some of the entities of network 100 (FIG. 1). Specifically, filtering database 222 has a plurality of records (not shown) each containing a plurality of cells, including a destination address cell, a destination port cell and a corresponding timer cell. Each record in the filtering database 222 preferably corresponds to a particular network entity.

The forwarding engine 210 is configured to switch or bridge network messages, such as data packets and/or frames, from a source port 106 to one or more destinations ports 106 depending on information contained in the forwarding database 222 and also on the spanning tree port states of the respective ports 106 as managed by STP engine 208. The forwarding engine 210 is also in communicating relationship with the STP engine 208 and relays STP-related messages, such as BPDU messages, received at ports 106. In other embodiments, STP engine 208 may also be directly coupled to the frame transmission and reception objects 204.

Figure 3:
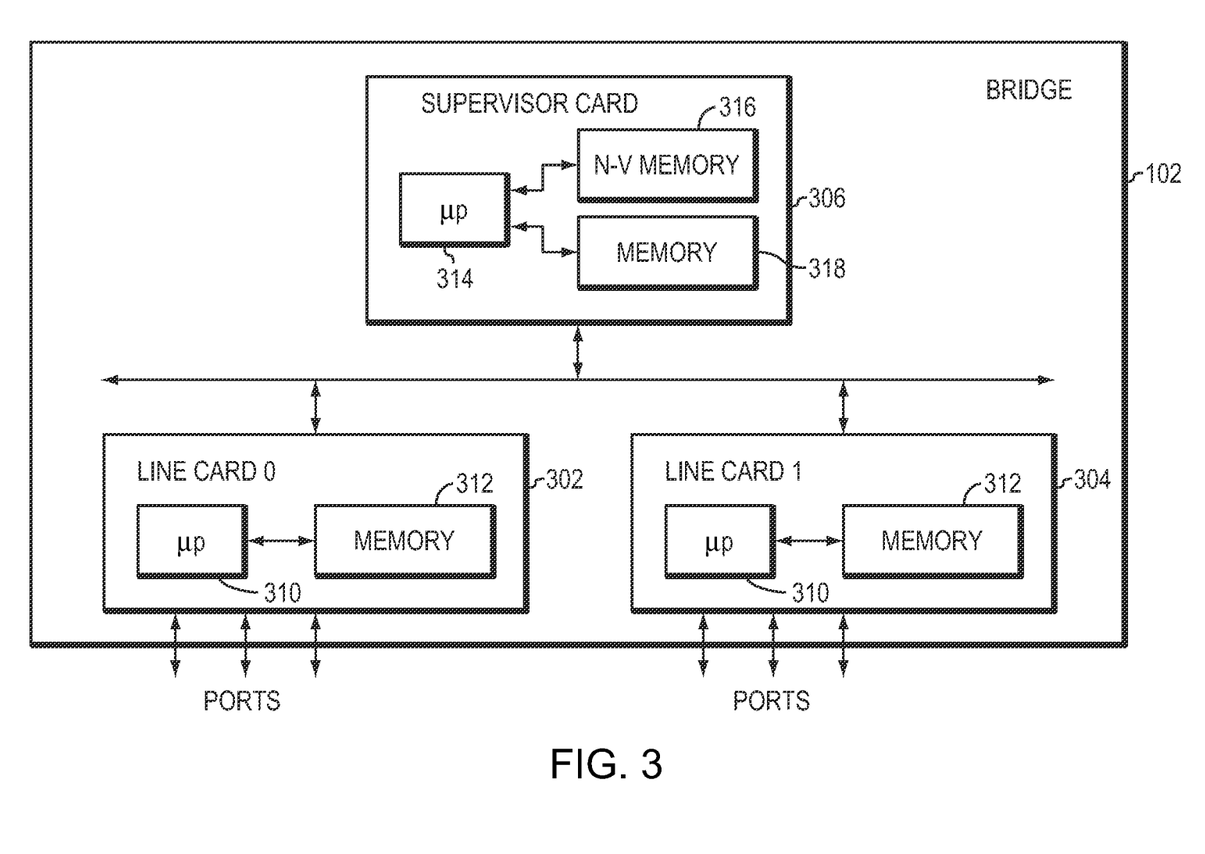

In the illustrated embodiment, bridge 102 includes transmitting and receiving circuitry, including one or more line cards and/or network interface cards (NICs) establishing ports for the exchange of network messages, one or more supervisor cards having central processing units (CPUs) and/or microprocessors and associated memory devices for performing computations and storing the results therefrom and one or more bus structures. FIG. 3 is another highly schematic, partial block diagram of bridge 102 illustrating such components. As shown in FIG. 3, bridge 102 includes a plurality of line cards 302 and 304, and a supervisor card 306. Cards 302, 304 and 306 are in communicating relationship with each other through a communication bus 308. Each of the line cards 302 and 304 includes a microprocessor (µP) 310 and at least one memory 312. The supervisor card 306 also includes a µP 314, as well as both a non-volatile (N-V) memory 316 and a volatile memory 318, e.g., RAM.

Referring again to FIG. 2, it will be understood by those skilled in the art that STP engine 208 and forwarding engine 210 may each comprise registers and combinational logic configured and arranged to produce sequential logic circuits. In the illustrated embodiment, engines 208 and 210 are preferably software modules or libraries stored at a memory, such as memory 312, and containing program instructions pertaining to the methods described herein and executable by one or more processing elements, such as µP 314, of switch 102. Other computer readable media may also be used to store and execute these program instructions. Nonetheless, those skilled in the art will recognize that various combinations of software and hardware, including firmware, may be utilized to implement the present invention.

Suitable intermediate network device platforms for use with the present invention include, but are not limited to, the commercially available Catalyst 4000 and 6000 series of switches from Cisco Systems, Inc. of San Jose, Calif.

Execution of the STP by bridges 102 and 104 of network 100 results in the convergence to an active topology with one device, e.g., bridge 102, being elected the root, as indicated by the letter "R". In this case, the ports of bridge 102 are assigned to the Designated Port Role, as indicated by the letter "D," and are transitioned to the forwarding state. At bridge 104, one port, e.g., the port coupled to segment 110 is assigned the Root Port Role, as indicated by the letter "R," and is transitioned to the forwarding state, and the port coupled to segment 108 is assigned to the Alternate Port Role, as indicated by the letter "A", as it represents an alternate path to root 110. The port assigned to the Alternate Port Role is transitioned to the blocking or discarding state. The terms blocking and discarding are used interchangeably herein.

With the conventional operation of the STP, such as the RSTP or the MSTP, once ports are assigned to the Root and Alternate Port Roles, the STP engine stops issuing BPDU messages from these ports. Here, in contrast, the bridge assurance sub-engine 218 of bridge 104 is specially configured to direct the STP engine 208 to continue to generate and send BPDU messages from its Root Port and its Alternate Port. Preferably, the bridge assurance sub-engine 218 directs the STP engine 208 to utilize its BPDU message generator 216 to generate and send BPDU messages periodically from ports assigned to both the Root Port Role and the Alternate Port Role. If bridge 104 had any ports assigned to the Backup Port Role, the bridge assurance sub-engine 218 may further direct the STP engine 208 to send periodically BPDU message from these ports as well. Thus, bridge assurance sub-engine 218 effectively directs STP engine 208 to send BPDU messages from the ports assigned to the Root, Alternate and Backup Roles In the preferred embodiment, the BA sub-engine 218 directs the STP engine 208 to send BPUD messages periodically from its ports assigned to the Root, Alternate and Backup roles irrespective of receiving any BPDU messages on its root port. Specifically, BA sub-engine 218 may further include one or more hello timers, such as hello timer 224. Each time the hello timer 224 expires, the BA assurance sub-engine 218 directs the STP engine 208 to send BPDU messages from the ports assigned to the Root, Alternate and Backup Roles. The BA sub-engine 218 then re-starts the hello time 224. The STP engine 208 may also utilize the hello timer 224 to trigger the issuance of BPDU messages from the bridge's Designated port(s), if any.

The BPDU messages sent from the ports assigned to the Root, Alternate and Backup roles preferably carry the ID of the bridge that the issuing bridge considers to be the root of the computer network, e.g., the bridge with the lowest numeric ID, in the BPDU message's root ID field. The BPDU messages also include the root path cost as calculated for the port from which the BPDU message is being sent in the message's Root Path Cost field.

In addition to directing the STP engine 208 to send BPDU messages from ports assigned to the Root, Alternate and Backup roles, the bridge assurance sub-engine 218 is further configured to look for BPDU messages to be received on all ports that are coupled to a neighboring bridge, even parts that are assigned to the Designated Port Role. The bridge assurance sub-engine 218 may determine that a given port is coupled to a neighboring bridge in several ways. For example, a network administrator may configure the bridge such that one or more ports are explicitly configured as being coupled to a neighboring bridge. This may be accomplished by entering one or more commands at a management console and/or by using the well-known Simple Network Management Protocol (SNMP). The bridge assurance sub-engine 218 may also determine that a given port is coupled to a neighboring bridge as a result of receiving a BPDU message on the given port.

For each port that is coupled to a neighboring bridge, the bridge assurance sub-engine 218 preferably assigns a corresponding BA timer to that port. The bridge assurance sub-engine utilizes the assigned BA timer to detect whether the flow of BPDU messages from its neighboring bridge is ever interrupted. The BA timer can also reveal the existence of a neighboring bridge that has not sent any BPDU messages. In accordance with the preferred embodiment, the bridge assurance sub-engine 218 preferably first starts the assigned BA timer when the respective port is brought up, e.g., initialized, provided that the port has been configured for bridge assurance operation. The bridge assurance sub-engine 218 then re-starts the BA timer when the first BPDU message is received. Thereafter, each time another BPDU message is received on the port, the bridge assurance sub-engine 218 again re-starts the BA timer assigned to that port. With reference to FIG. 1. The bridge assurance sub-engine 218 at bridge 102 establishes a first BA timer, e.g., timer 217a, for its port coupled to segment 110, and a second BA timer, e.g., timer 217b, for its port coupled to segment 108. If a BA timer ever expires, indicating either that (1) no BPDU message was ever received on this port or (2) that the flow of BPDU messages has stopped, then the bridge assurance sub-engine 218 detects a failure condition.

It should be understood that the expiration of a BA timer may be caused by several circumstances. First, the link between the two bridges may have suffered a failure. For example, segment 110 may suffer from a uni-directional failure condition such that it cannot transmit any message from bridge 104. In this case, bridge 104 may still be able to receive messages from bridge 102 via segment 110, but bridge 102 can no longer receive any messages from bridge 104 via segment 110. As a result, bridge 102a will stop receiving BPDU messages from bridge 104 via segment 110, and the BA timer assigned to this port, e.g., timer 217a, will eventually time-out and expire. Another situation that might trigger the expiration of BA timer 217a at bridge 102 is a control plane failure at bridge 104. For example, the STP process running at bridge 104 may crash, causing bridge 104 to stop sending BPDU messages from any of its ports.

In response to the expiration of a BA timer, the bridge assurance sub-engine 218 may take one or more actions. In the preferred embodiment, the bridge assurance sub-engine 218 responds by reporting the error condition to the network administrator. In particular, the sub-engine 218 may direct the STP engine 208 or some other entity at bridge 102 to issue an error message to the management console or to some other network management device. By virtue of such an error message, a network administrator may investigate and hence determine the true cause of the error condition.

Bridge assurance sub-engine 218 may also direct the port whose BA timer expired to transition to a blocking or discarding state to prevent the possible formation of a loop in the bridged network. More specially, as indicated above, the bridge assurance sub-engine 218 establishes a BA timer for each port coupled to a neighboring bridge. Thus, the bridge assurance sub-engine at bridge 104 establishes a BA timer for each of its two ports. Suppose, the BA timer established for the port of bridge 104 coupled to segment 108, which port is assigned to the Alternate Port Role and is thus blocked from sending or receiving data messages, expires. Suppose further that the BA timer expires because the STP process at bridge 102 crashes thereby stopping the flow of BPDU messages from bridge 102 to bridge 104 via segment 108, even though the ports of bridge 102 continue to send and receive data messages. The conventional STP would respond by transitioning the port at bridge 104 from the Alternate Port Role to the Designated Port Role, and the port would be moved from the discarding state to the forwarding state. However, because bridge 102 continues to forward data messages, an undesirable loop would be formed between bridges 102 and 104.

In contrast, with the present invention, the bridge assurance sub-engine 218, in response to detecting the expiration of the BA timer assigned to the port, preferably blocks the STP engine 208 at bridge 104 from assigning this port to the Designated Port Role. Instead, the bridge assurance sub-engine 218 directs the STP engine 208 to keep this port in the blocking or discarding state. In this way, the bridge assurance sub-engine 218 of the present invention prevents the formation of a permanent loop within the network.

Figure 4:
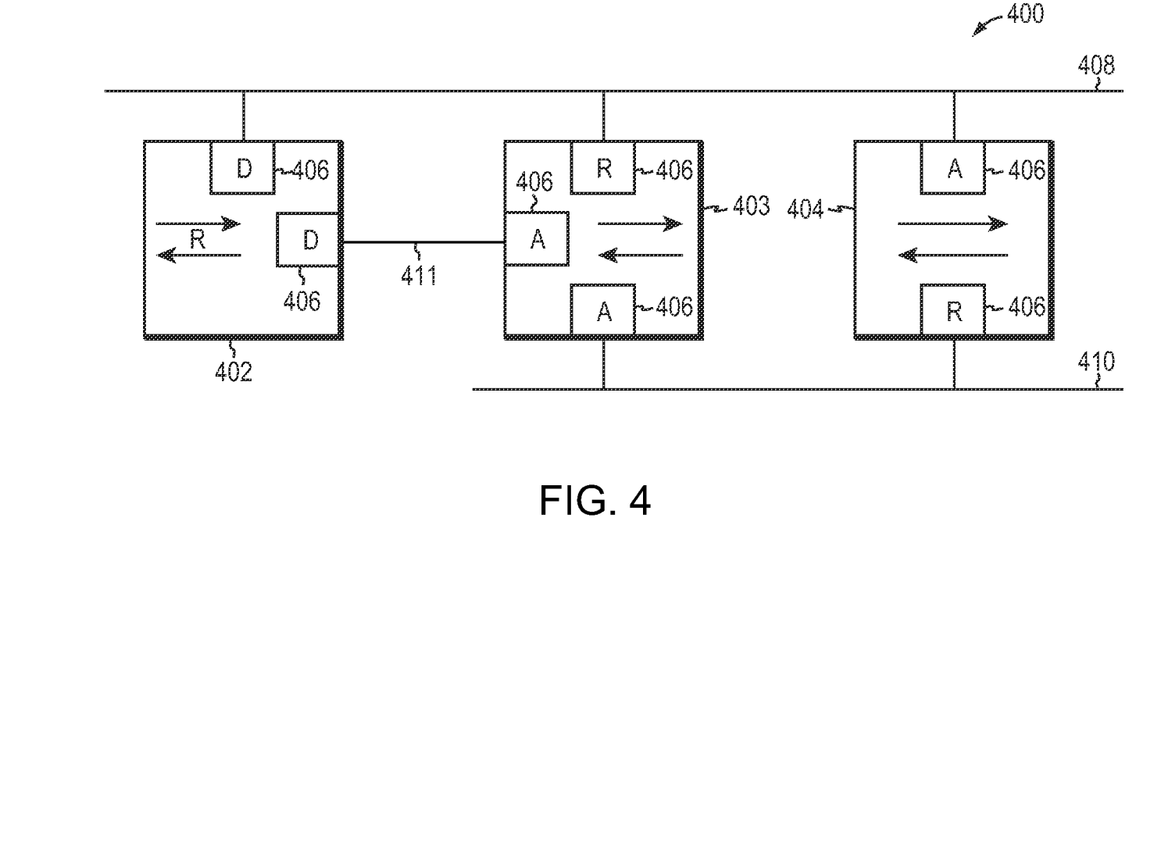
FIG. 4 is a highly schematic illustration of a computer network.

The bridge assurance sub-engine also prevents the formation of permanent loops due to other circumstances that are not detected by the conventional STP. FIG. 4 is a highly schematic illustration of a computer network 400. Network 400 has three bridges 402, 403, and 404. Each bridge, moreover, has a plurality of ports 406. All three bridges 402-304 are interconnected by a shared segment 408. In addition, bridges 403 and 404 are interconnected by a second shared segment 410, and bridges 402 and 403 are directly connected by link 411. Suppose, bridge 402 is elected the root of the bridged network 400, as indicated by the letter "R." Bridge 402 thus assigns its two ports 406 to the Designated Port Role, and transitions them to the forwarding state. Suppose further that bridge 403 assigns its port coupled to segment 408 to the Root Port Role, and its other two ports to the Alternate Port Role. Suppose also that bridge 404 assigns its port coupled to segment 410 to the Root Port Role and its other port to the Alternate Port Role.

Now suppose that bridge 404 experiences a uni-directional link failure regarding its port coupled to segment 408. That is, bridge 404 can continue to send data and control messages onto segment 408, but cannot receive any data or control messages from segment 408. Accordingly, bridge 404 will stop receiving periodic BPDU messages from bridge 402 whose port is coupled to segment 408 and is assigned to the Designated Port Role. Bridge 404 will also stop receiving periodic BPDU messages from bridge 403, even though its port is assigned to the Alternate Port Role, because the bridge assurance sub-engine 218 at bridge 403 sends BPDU messages onto segment 408. Nonetheless, none of these BPDU messages will be received by bridge 404. Accordingly, the spanning tree information stored by bridge 404 for its port coupled to segment 408 will age out, and bridge 404 will be begin to issue BPDU messages that contain inferior STP information as compared to the STP information contained in BPDU messages from root bridge 402, which superior information is also stored at bridge 403. Because bridge 404 cannot receive the superior BPDU message from root bridge 402, it would, through conventional operation of the STP, re-assign its port coupled to segment 408 from the Alternate Port Role to the Designated Port Role, and transition the port from the discarding state to the forwarding state. Such a transition would result in the formation of a loop in the bridged network 400.

The bridge assurance sub-engine 218 at bridge 403, however, prevents the formation of this loop. In particular, when the bridge assurance sub-engine 218 at bridge 403 detects the receipt of an "inferior" BPDU messages from bridge 404, it preferably assigns and starts a role restricted timer 219 for the port on which the "inferior" BPDU was received. Furthermore, because this port now has a restricted role timer running, the bridge assurance sub-engine 218 of bridge 403 directs the STP engine 208 to transition the port to the discarding state. Because this port was the root port for bridge 403, this forces bridge 403 to elect a new root port for itself. Furthermore, so long as the role restricted timer continues to run, the bridge assurance sub-engine 218 prevents the STP engine from assigning this port to any spanning tree role in which the port would be forwarding. That is, the bridge assurance sub-engine 218 prevents the port from becoming a Root Port. In particular, each time the STP engine 208 receives superior BPDU information from bridge 402 via segment 408, and seeks to assign its port 406 coupled to segment 408 to the Root Port Role, the running of the role restricted timer causes the bridge assurance sub-engine 218 to block such action. As a result, the port at bridge 403 coupled to segment 408 ends up becoming an Alternate Port, and the port of bridge 403 that is coupled to bridge 402 via link 411 ends up becoming the bridge's new root port.

The role restricted timer may be set to expire at the max age value. In an alternative embodiment, it may also be disabled if bridge 403 begins receiving BPDU messages from bridge 404 that contain superior information, thereby indicating that the uni-directional link failure has been corrected.

The foregoing description has been directed to specific embodiments of this invention. It will be apparent, however, that other variations and modifications may be made to the described embodiments, with the attainment of some or all of their advantages. For example, other STP control messages, besides or in addition to the configuration bridge protocol data unit messages, may be issued by the STP engine. Therefore, it is an object of the appended claims to cover all such variations and modifications as come within the true spirit and scope of the invention.

What is claimed is:

1. A method comprising:
   executing a spanning tree protocol (STP) at an intermediate network device to assign a first port of the intermediate network device to a Root Port Role, a second port of the intermediate network device to an Alternate Port Role, a third port of the intermediate network device to a Designated Port Role, and a fourth port of the intermediate network device to a Backup Port Role;
   periodically sending at least one bridge protocol data unit (BPDU) message from the first port assigned Root Port Role, the second port assigned Alternate Port Role and the fourth port assigned Backup Port Role, irrespective of receipt of any BPDU messages at the intermediate network device from neighboring intermediate network devices;
   detecting a failure to receive a BPDU message from a neighboring intermediate network device on the third port assigned Designated Port Role within a threshold amount of time; and
   in response to the failure to receive the BPDU message from the neighboring intermediate network device, taking one or more actions.

2. The method of claim 1, further comprising:
   operating a hello timer having a threshold,
   wherein the periodically sending sends the at least one BPDU from the first port assigned Root Port Role, the second port assigned Alternate Port Role and the fourth port assigned Backup Port Role each time the hello timer reaches the threshold.

3. The method of claim 1, wherein the detecting further comprises:
   starting a timer associated with the third port assigned Designated Port Role;
   re-starting the timer each time a BPDU message is received on the third port assigned Designated Port Role; and
   detecting the failure to receive the BPDU message when the timer reaches the threshold.

4. The method of claim 1, further comprising:
   determining that the third port assigned Designated Port Role is coupled to the neighboring intermediate network device based on explicit configuration of the third port by a network administrator.

5. The method of claim 1, further comprising:
   determining that the third port assigned Designated Port Role is coupled to the neighboring intermediate network device based on receipt of one or more BPDU messages on the third port.

6. The method of claim 1, further comprising:
   detecting a further failure to receive a BPDU message from a neighboring intermediate network device on the first port assigned Root Port Role, the second port assigned Alternate Port Role or the fourth port assigned Backup Port Role; and
   in response to the further failure, taking one or more further actions.

7. The method of claim 1, further comprising
   periodically sending at least one BPDU message from the third port assigned Designated Port Role.

8. The method of claim 1, wherein the one or more actions include blocking the third port.

9. The method of claim 1, wherein the one or more actions include issuing an error message to a network management device.

10. An apparatus comprising:
a plurality of ports;
a memory configured to store indications of assigned port roles for the plurality of ports;
a spanning tree protocol (STP) engine configured to assign a first port of the plurality of ports to a Root Port Role and a second port of the plurality of ports to an Alternate Port Role;
a memory configured to store indications of assigned port roles; and
a bridge assurance sub-engine cooperating with the STP engine, the bridge assurance sub-engine configured to
  direct the STP engine to periodically send at least one bridge protocol data unit (BPDU) message from the first port assigned Root Port Role and the second port assigned Alternate Port Role, irrespective of receipt of any BPDU messages at the apparatus from neighboring intermediate network devices on the first port assigned Root Port Role or the second port assigned Alternate Port Role,
  detect a failure to receive a BPDU message within a threshold amount of time on a particular port of the plurality of ports that is coupled to a neighboring intermediate network device, and
  in response to the failure to receive the BPDU message on the particular port, block the particular port.

11. The apparatus of claim 10, further comprising:
a hello timer having a threshold,
wherein the bridge assurance sub-engine is further configured to direct the STP engine to periodically send the at least one BPDU message from the first port assigned Root Port Role and the second port assigned Alternate Port Role each time the hello timer reaches the threshold.

12. The apparatus of claim 10, further comprising:
a bridge assurance (BA) timer configured to re-start each time a BPDU message is received on the particular port and to expire if not re-started,
wherein the bridge assurance sub-engine is further configured to detect the failure to receive the BPDU message by expiration of the BA timer.

13. The apparatus of claim 10, wherein the bridge assurance sub-engine is further configured to determine that the particular port is coupled to the neighboring intermediate network device based on explicit configuration by a network administrator.

14. The apparatus of claim 10, wherein the bridge assurance sub-engine is configured to determine that the particular port is coupled to the neighboring intermediate network device based on receipt of one or more BPDU messages on the particular port.

15. The apparatus of claim 10, wherein the bridge assurance sub-engine is further configured to direct the STP engine to periodically send at least one BPDU message from a third port assigned Designated Port Role.

16. The apparatus of claim 10, wherein the bridge assurance sub-engine is further configured to direct the STP engine to periodically send at least one BPDU message from a fourth port assigned Backup Port Role, irrespective of receipt of any BPDU messages at the apparatus from neighboring intermediate network devices on the fourth port assigned Backup Port Role.

17. The apparatus of claim 10, wherein the bridge assurance sub-engine is further configured to, in response to the failure to receive the BPDU message on the particular port that is coupled to the neighboring intermediate network device, issue an error message to a network management device.

18. A non-transitory computer-readable medium having software encoded thereon, the software when executed operable to:
execute a spanning tree protocol (STP) to assign a first port of an intermediate network device to a Root Port Role, a second port of the intermediate network device to an Alternate Port Role, a third port of the intermediate network device to a Designated Port Role, and a fourth port of the intermediate network device to a Backup Port Role;
periodically send at least one bridge protocol data unit (BPDU) message from the first port assigned Root Port Role, the second port assigned Alternate Port Role and the fourth port assigned Backup Port Role, irrespective of receipt of any BPDU messages at the intermediate network device from neighboring intermediate network devices;
detect a failure to receive a BPDU message within a threshold amount of time on a particular port that is coupled to a neighboring intermediate network device; and
in response to the failure to receive the BPDU message, block the particular port.

19. The non-transitory computer-readable medium of claim 18, wherein the software when executed is further operable to:
operate a hello timer having a threshold; and
send the at least one BPDU from the first port assigned Root Port Role, the second port assigned Alternate Port Role and the fourth port assigned Backup Port Role each time the hello timer reaches the threshold.

20. The non-transitory computer-readable medium of claim 18, wherein the software when executed is further operable to:
start a timer associated with the particular port;
re-start the timer each time a BPDU message is received on the particular port; and
detect the failure to receive a BPDU message when the timer reaches the threshold.

* * * * *